United States Patent [19]
Van Order et al.

[11] Patent Number: 5,582,474
[45] Date of Patent: Dec. 10, 1996

[54] VEHICLE LIGHT ASSEMBLY

[75] Inventors: Kim L. Van Order, Hamilton; Brian L. Spoelman, Hudsonville, both of Mich.

[73] Assignee: Prince Corporation, Holland, Mich.

[21] Appl. No.: 318,123

[22] Filed: Oct. 5, 1994

[51] Int. Cl.$^6$ ..................................................... B60Q 3/02
[52] U.S. Cl. ................ 362/74; 362/80; 362/245; 362/309; 362/330; 362/335; 359/19
[58] Field of Search .................... 362/61, 74, 80, 362/80.1, 328, 332, 75, 100, 244–246, 309, 330, 333–340; 359/15, 19, 20, 13

[56] References Cited

U.S. PATENT DOCUMENTS

| | | | |
|---|---|---|---|
| D. 324,111 | 2/1992 | Arbisi | D26/28 |
| 4,000,404 | 12/1976 | Marcus | 362/135 |
| 4,421,355 | 12/1983 | Marcus | 296/97 H |
| 4,486,829 | 12/1984 | Marcus et al. | 362/142 |
| 4,536,833 | 8/1985 | Davis | 362/293 |
| 4,655,554 | 4/1987 | Armitage | 359/71 |
| 4,916,593 | 4/1990 | Moss et al. | 362/80.1 |
| 5,101,193 | 3/1992 | Smith et al. | 362/80.1 |
| 5,186,533 | 2/1993 | Hori | 362/80.1 |
| 5,227,773 | 7/1993 | Wu et al. | 382/31 |
| 5,347,435 | 9/1994 | Smith et al. | 362/80.1 |
| 5,365,354 | 11/1994 | Jannson et al. | 359/15 |

OTHER PUBLICATIONS

Exhibit A is a product brochure entitled "Holographic Diffusers" published by Physical Optics Corporation, Torrance, California, disclosing holographic diffuser technology and its properties, publication date unknown but the price list being dated May 1, 1994.

*Primary Examiner*—Denise Gromada
*Assistant Examiner*—Alan B. Cariaso
*Attorney, Agent, or Firm*—Price, Heneveld, Cooper, DeWitt & Litton

[57] ABSTRACT

A vehicle light assembly includes a housing for attachment to a vehicle, a light source mounted to the housing, and a lens and/or reflector attached to the housing for controlling the distribution of light from the light source. The lens and/or reflector includes a surface with microvariations formed therein to define a holographic optical element that directs the light into a predetermined pattern for illuminating an area. The lens so formed simultaneously eliminates undesirable uneven light distribution such as glare, "spider webbing," light/dark patchiness and chromatic aberrations in and around the predetermined light pattern.

17 Claims, 4 Drawing Sheets

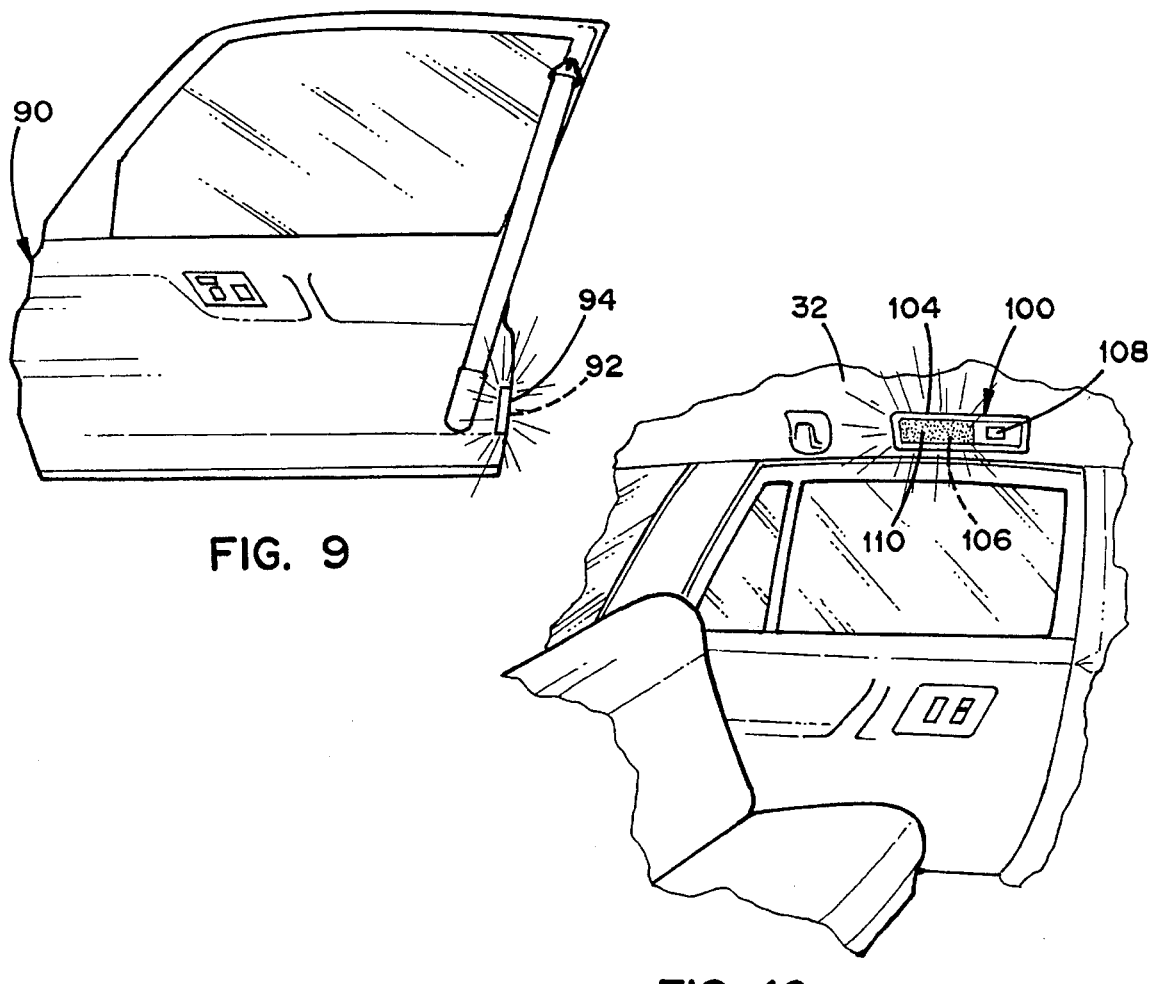

VEHICLE LIGHT ASSEMBLY

BACKGROUND OF THE INVENTION

The present invention relates to vehicle lighting accessories, and in particular to a vehicle interior light including a lens for uniformly distributing light to illuminate a specific area in a uniform manner.

Modern vehicles include a variety of lighting accessories, such as map lights, overhead consoles including lights, and other passenger compartment lights. The lighting accessories must provide enough light at a sufficient intensity and uniformity over a large enough area to illuminate the particular area to be viewed or to provide light for the particular task to be performed. Such lighting should not provide stray light that will distract the attention of the driver of the vehicle. Various lighting accessory configurations have been used with varying degrees of success, however, further improvements are desired to provide better control over the size and uniformity of the resultant light distribution, along with a reduction in stray light and glare.

One technology in particular, i.e. "pillow optics" technology, has been used in lens of map lights in an effort to improve on the above noted problems. Pillow optics technology uses a plurality of small, dish-shaped depressions or protrusions on a lens surface to direct individual sections of light in desired directions. In effect, each dish-shaped depression or protrusion acts like a mini magnifying glass to direct the light in a given direction. The size of these depressions or protrusions, their radii, and their relative orientation is predetermined through relatively extensive testing to achieve an acceptable pattern of light. The individual depressions can be substantially any size desired, but usually are in the range of about 1 mm×1 mm to about 2 mm×3 min. However, "pillow optics" lens characteristically produce non-uniform light patterns. For example, "pillow optic" lens result in glare, which is blinding, dazzling spots of light; "spider webbing," which is randomly oriented fine streaks of bright light having the appearance of a spider web; light/dark patchiness, which is relatively bright regions and adjacent relatively dark regions within the overall pattern; and chromatic aberrations, which are rainbow-like colored patterns at the edges of the lighted pattern.

With pillow optics technology, it is possible to redesign individual sections of the "pillow optics" lens to redistribute light from bright areas toward dark areas. However, it is not possible to control light rays well enough with the pillow optics technology to eliminate these problems. Such non-uniform light patterns are irritating to the human eye and make it difficult to use the light for very long or for tasks such as for reading or studying a map. Further, it is not uncommon to spend over 150 hours of design, testing, and redesign time to arrive at an acceptable light pattern before prototypes can be made. In the highly competitive automotive industry, such extensive testing and design time adds excessive cost to a product and can delay the introduction of new products. Also, a lens including pillow optics technology has a multi-surfaced crystal-like appearance that frequently does not compliment the non-glossy decor of other components in the vehicle passenger compartment, thus creating a less than desirable mismatched appearance. Nonetheless, "pillow optics" technology has been generally accepted by the industry as one of the preferred ways of controlling/dispersing light into a predetermined pattern.

Modern luxury vehicles are also often provided with lighting accessories having lenses incorporating "prism optics" technology, sometimes called "V-groove optics" technology, to control light distribution. Prism optics technology uses a plurality of elongated triangularly-shaped prismatic surfaces to direct individual sections of light in desired directions. However, prism optics lens have the same problems as pillow optics lens, as noted above, such as glare, "spider webbing," light/dark patchiness and chromatic aberrations. Also, in addition to the problems noted above, both of these lenses must be spaced significantly from the light source in order to be very effective. This results in a relatively thicker product, which is undesirable since passenger headroom is a problem in vehicle passenger compartments, especially in view of governmental standards relating to occupant safety such as for crash testing.

Therefore, a vehicle accessory light including a lens for uniformly illuminating an area solving the aforementioned problems is desired.

SUMMARY OF THE INVENTION

A light assembly for a vehicle includes a housing configured for attachment to the vehicle, a light source mounted to the housing, and a lens attached to the housing for controlling the distribution of light from the light source. The lens includes a surface having microvariations therein forming a holographic optical element that directs the light into a predetermined pattern for illuminating an area of the vehicle spaced from the lens. The holographic optical element eliminates undesirable uneven light distribution such as glare, "spider webbing," patchiness and chromatic aberrations in and around the pattern provided by the lens.

These and other features and advantages of the present invention will be further understood by those of ordinary skill in the art by reference to the following specification, claims and appended drawings.

BRIEF DESCRIPTION OF THE DRAWINGS

FIG. 9 is a front, elevational view of a vehicle door panel including a light accessory embodying the present invention;

FIG. 10 is a fragmentary, perspective view of the rear seat area of a vehicle including a headliner having a light accessory embodying the present invention;

DESCRIPTION OF PRIOR ART

Figure 1:
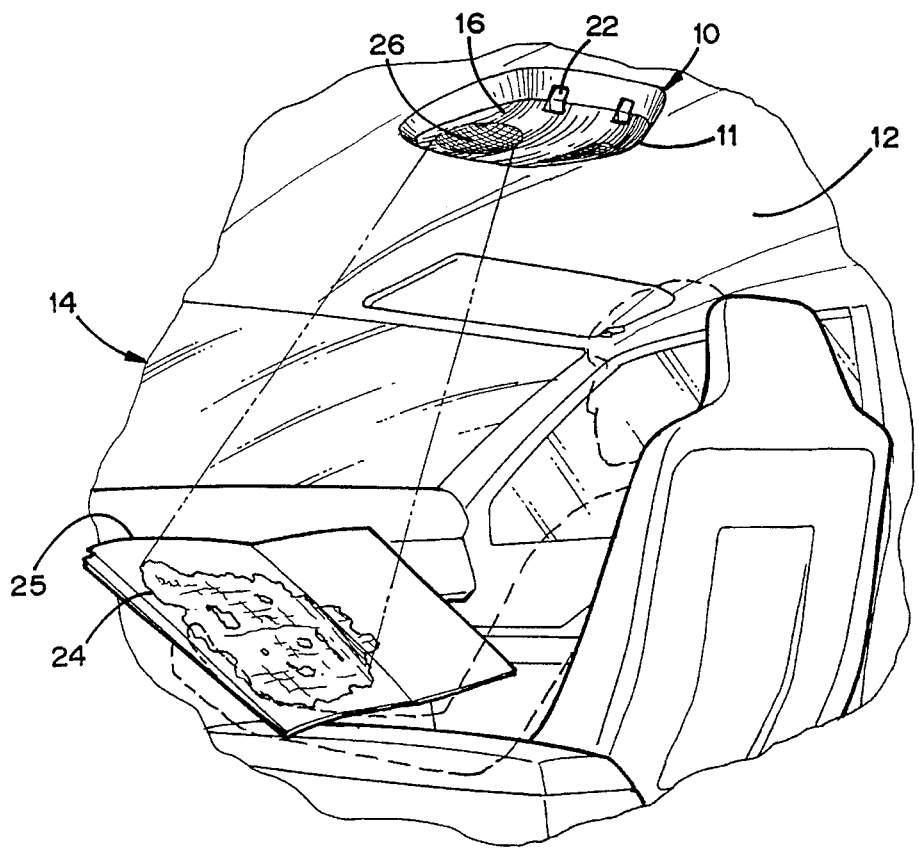
FIG. 1 is a perspective view of an overhead console including a prior art vehicle map light.
Figure 4:
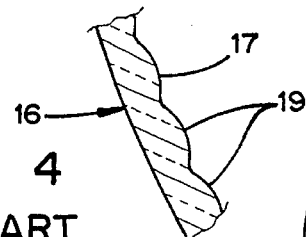
FIG. 4 is an enlarged, fragmentary view of the lens shown in FIG. 3.
Figure 2:
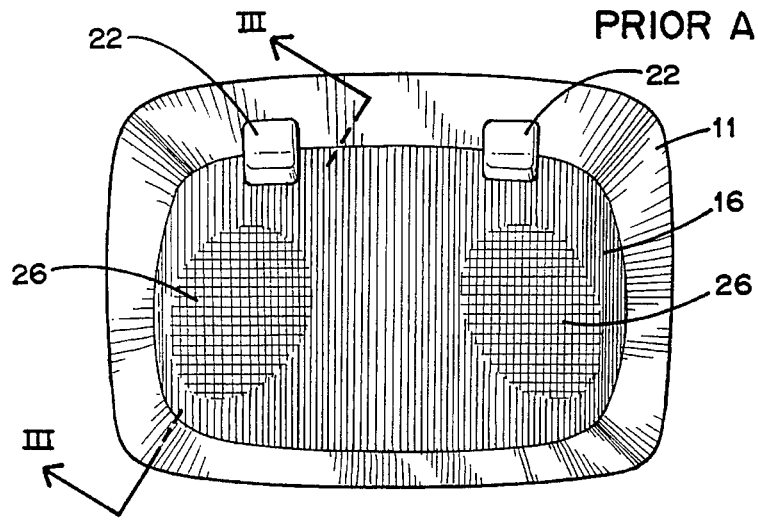
FIG. 2 is a plan view of the map light shown in FIG. 1.

An exemplary overhead console 10 (FIGS. 1–4) of the prior art includes a housing 11 adapted for attachment to the roof 12 of a vehicle such as an automobile 14. Housing 11 supports a lens 16 configured to cover an opening in the housing 11. Lens 16 includes a pair of patches 26 including "pillow optics" technology for focusing light that passes through lens 16, as discussed hereinafter. A pair of light sources 18 (FIG. 3) are positioned under patches 26 proximate the opening, and a pair of parabolic reflectors 20 direct light from the light sources 18 generally toward the lens 16 opening. Switches 22 (FIG. 2) are connected to light sources 18 and to the vehicle's electrical system in a conventional manner to turn the light sources 18 on and off.

Figure 3:
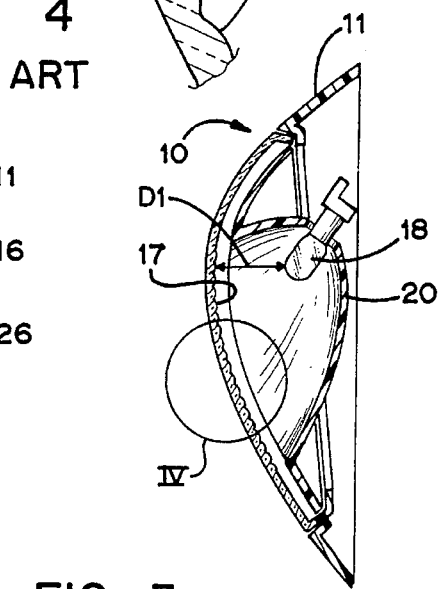
FIG. 3 is a cross-sectional view taken along the lines III—III in FIG. 2.

The lens 16 includes an inner surface 17 (FIG. 4) located a distance "D1" from bulb 18 (FIG. 3). Inner surface 17 is covered with multiple rounded protrusions 19 incorporating "pillow optics" technology that direct light from the light source 18 (FIG. 3) generally into a predetermined pattern 24 (FIG. 1) for illuminating an object 25 therebelow. The lens 16 is made of polycarbonate and has a generally clear, crystalline appearance facilitating light transfer through the lens. Contrastingly, the housing 11 has a textured surface to reduce glare and to reduce the visibility of surface imperfections such as fingerprints and scratches thereon. Lens 16 incorporates "pillow optic" technology at least in the oblong patches 26 of lens 16 to distribute light. However, the clear, crystalline appearance of the lens 16 and the light bending characteristics of individual rounded protrusions 19 results in the following problems: glare, which is blinding, dazzling spots of light; "spider webbing," which is randomly oriented fine streaks of bright light having the appearance of a spider web; light/dark patchiness, which is relatively bright regions and adjacent relatively dark regions within the overall pattern; and chromatic aberrations, which are rainbow-like colored patterns at the edges of the lighted pattern. Notably, the appearance of the lens 16 and, in particular, patches 26 also does not match the textured, non-glare surface on the exterior of the housing 11.

DETAILED DESCRIPTION OF PREFERRED EMBODIMENTS

Figure 5:
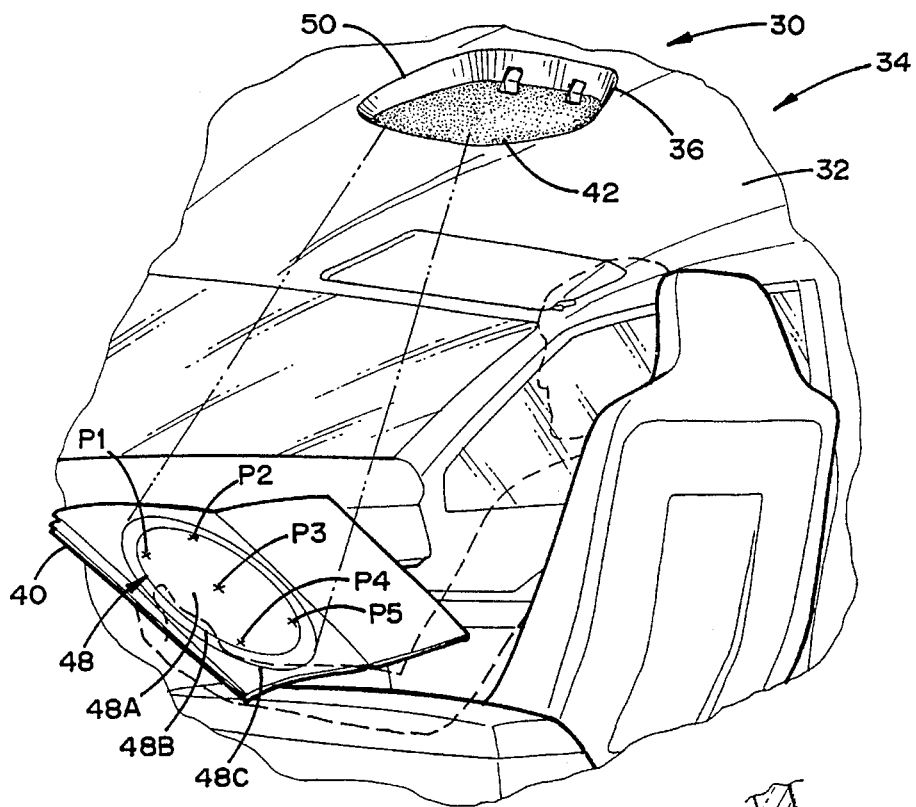
FIG. 5 is a perspective view of an overhead console including a vehicle map light embodying the present invention.
Figure 8:
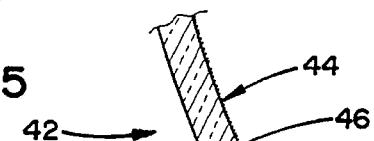
FIG. 8 is an enlarged, fragmentary view of the lens shown in FIG. 7.
Figure 6:
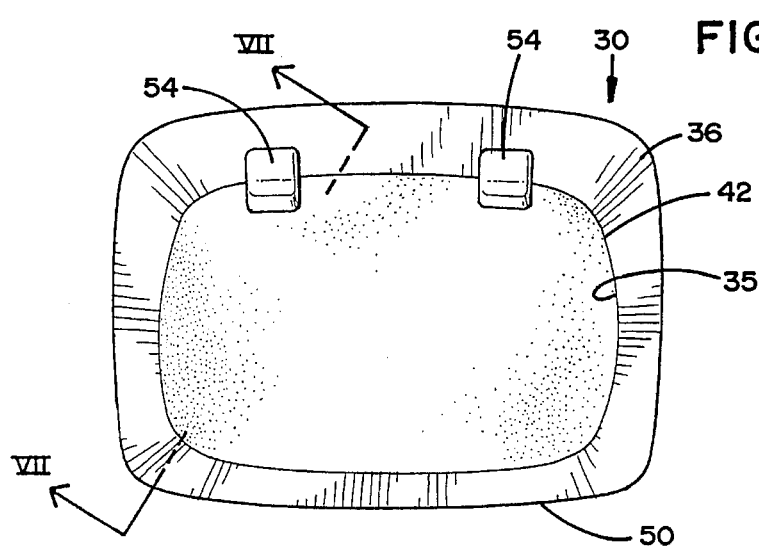
FIG. 6 is a plan view of the overhead console shown in FIG. 5.
Figure 7:
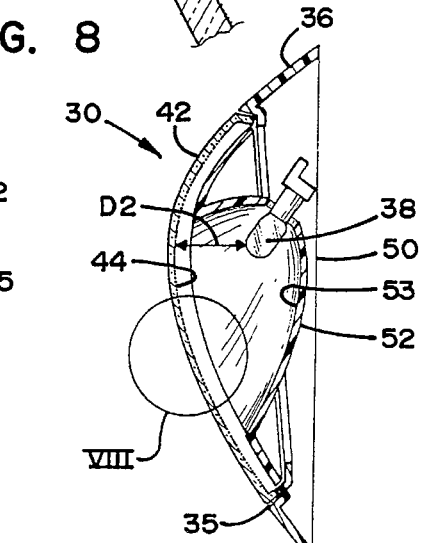
FIG. 7 is a cross-sectional view taken along the lines VII—VII in FIG. 6.

A vehicle light assembly 30 (FIG. 5) embodying the present invention is mounted to the headliner 32 of a vehicle such as an automobile 34. Assembly 30 includes a housing 36 configured for attachment to the headliner 32. A light source or lamp 38 is mounted to the housing 36 for generating light to illuminate an object 40 such as a map. A lens 42 is attached to the edge of a central opening 35 (FIG. 6) of the housing 36 for controlling the distribution of light from the light source 38. The lens 42 includes an inner surface 44 (FIGS. 7–8) with microvariations 46 formed therein forming a holographic optical element that directs the light into a predetermined uniform pattern 48 (FIG. 5) for illuminating the object 40. The lens 42 simultaneously eliminates undesirable uneven light distribution such as glare, "spider webbing," light/dark patchiness and chromatic aberrations in and around the predetermined pattern 48. Notably, the microvariations (46) can also be located on the outside surface of the lens 42, or on the reflective surface 53 on reflector 52, as discussed below.

Housing 36 includes an upper peripheral edge 50 (FIGS. 5–7) configured to mateably engage the headliner 32. The housing 36 has sufficient depth and structure to receive a pair of light sources 38 (FIG. 7) such as conventional lamps, and to receive a pair of parabolically-shaped reflectors 52 mounted to housing 36 and positioned behind light sources 38 for reflecting light therefrom. Lens 42 is a concavely-shaped member made of a generally transparent plastic such as acrylic or polycarbonate. Lens 42 is configured for snap attachment within opening 35 of housing 36. Switches 54 are attached to housing 36 and coupled to lamps 38 and the vehicle's electrical system in a conventional manner for actuating the lamps 38. When a switch 54 is actuated, light source 38 emits light directly toward lens 42 and toward reflector 52 which reflects light along generally parallel light rays toward lens 42.

The inner surface 44 of lens 42 (FIGS. 7–8) includes microvariations 46 forming a holographic optical element that directs light into the predetermined pattern 48 for illuminating object 40 (FIG. 5) in the lap area of a passenger. Lens 42 is illustrated as being slightly concave relative to the light source 38 (FIG. 7), although it is noted that a flat lens or convex lens could also be provided. The light source 38 emits light at an acute angle to the holographic optical element or lens inner surface 44, which angle ranges from 90° to about 10° without unacceptably affecting the performance of the holographic optical element microvariations 46. The microvariations 46 are substantially so small that individual microvariations are too small to be distinguishable by the naked eye, but rather appear to present a frosted or textured appearance that from the outside appearance of the lens generally matches the textured finish on the housing 36. This provides a very attractive lens that advantageously does not produce or reflect unwanted glare, particularly when the holographic optical element is on the outside surface. Notably, inner surface 44 is located a distance D2 from bulb 38 (FIG. 7) which is smaller than distance D1 (FIG. 3) thus permitting a more compact design of housing 36 than for housing 11.

Figure 7A:
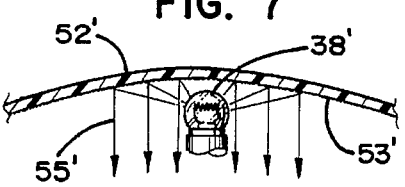
FIG. 7A is a schematic view of a modified reflector including microvariations defining a holographic optical element.

Advantageously, microvariations (46) can be formed on reflective surface 53 of reflector 52. Thus, reflector 52 can also be made flat or at least less concave while still providing an acceptable amount of control over reflected light. Advantageously, this allows console assembly 30 to be designed even thinner. For example, see reflector 52 including reflective surface 53', light source 38', and parallel light rays 55' in FIG. 7A.

To manufacture microvariations 46, a mirror image of the microvariations of a holographic optical element are formed in the surface of a mold for injection molding lens 42. Alternatively, microvariations 46 are formed in a film applied on the surface of the lens itself after it is molded. The holographic optical element pattern used for the lens or film mold is commercially available from the Physical Optics Corporation of Torrance, Calif. It basically consists of a surface holographic pattern formed by laser interferometry on a photo resist substrate. Subsequent to development, a metal master is made using conventional transfer processes which forms the surface of a mold subsequently employed to mold the lens.

Figure 11:
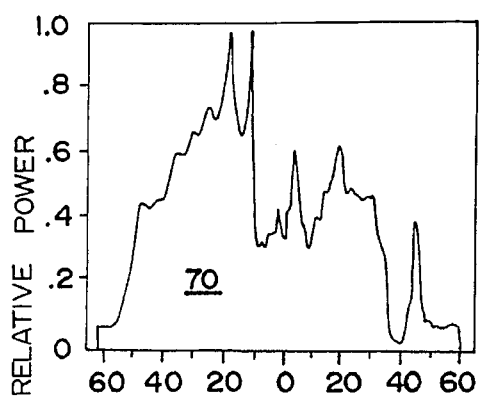
FIG. 11 is a light scatter diagram showing light scatter of untreated light from an exemplary light source.
Figure 12:
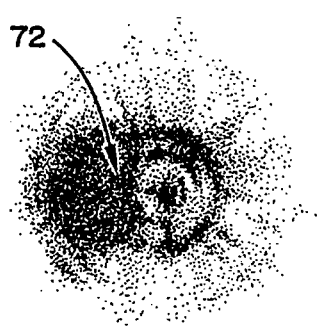
FIG. 12 is a schematic plan view of an untreated light pattern from the exemplary light source of FIG. 11.
Figure 13:
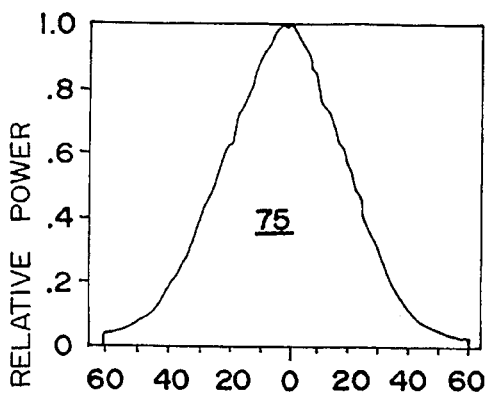
FIG. 13 is a light scatter diagram of the light pattern from the same source as shown in FIGS. 11 and 12 after passing through a holographic optical element for producing a circular pattern of light.
Figure 14:
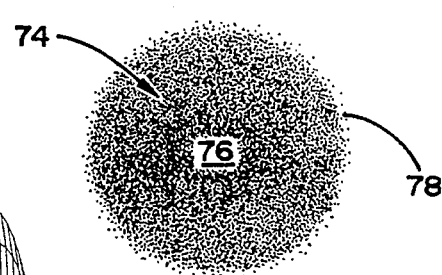
FIG. 14 is a schematic plan view of the light pattern resulting from the holographic optical element producing the circular scatter diagram of FIG. 13.
Figure 15:
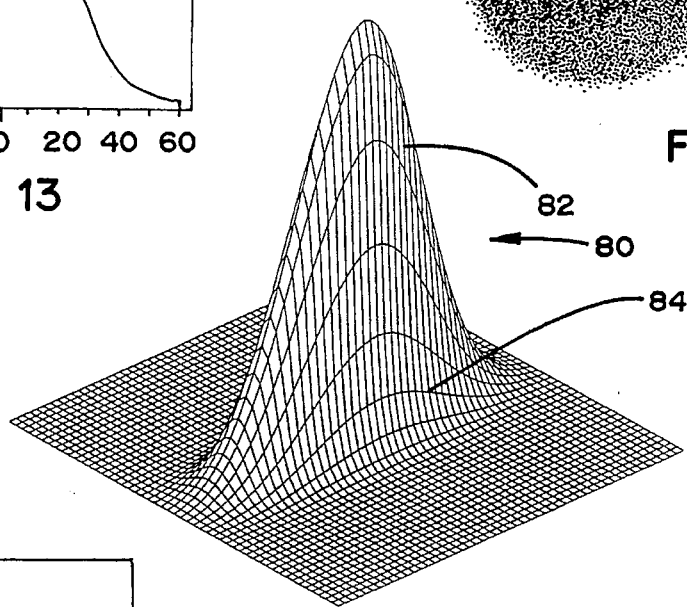
FIG. 15 is a three dimensional schematic diagram illustrating the elliptical light distribution of a holographic optical element lens for producing an elliptical shape, as illustrated in FIGS. 5–10.
Figure 16:
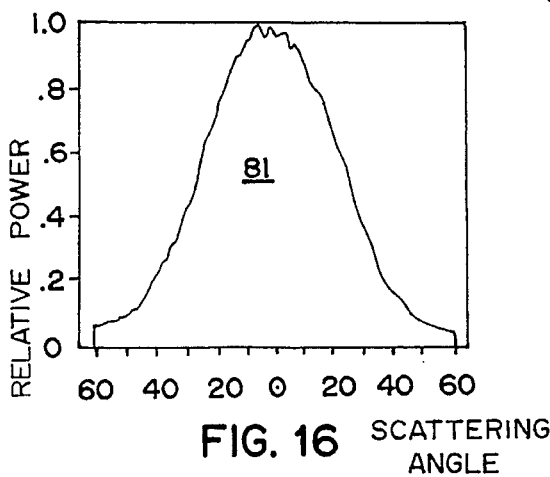
FIG. 16 is a light scatter diagram of the light pattern after the light has passed through a holographic optical element for producing an elliptical pattern of light as shown in FIG. 15.
Figure 17:
FIG. 17 is a schematic plan view of the light pattern produced by the holographic optical element for producing an elliptical shape as shown in FIG. 15.

The advantages of the uniform light pattern resulting from the use of the holographic optical element lens, and the absence of glare and other non-uniformities, are surprisingly effective in the environment of a vehicle passenger compartment. The effectiveness of the holographic optical element lens is best seen by reference to FIGS. 11–17. In FIGS. 11–12, an untreated light source produces a non-uniform pattern as shown by pattern 72 (FIG. 12) and by the scatter diagram 70 (FIG. 11). However, the same light source treated by a holographic optical element for producing a circular pattern produces a pattern 74 (FIG. 14) with uniform central section 76 and edge 78 with uniform decreasing light intensity as shown in the scatter diagram 75 (FIG. 13). Also, a holographic optical element for producing an elliptical pattern produces a pattern 80 having a central section 82 and edge 84 with uniform decreasing light intensity as shown by the light scatter diagram 81 and light pattern 80 of FIGS. 15–17.

Pattern 48 (FIG. 5) in the vehicle is surprisingly and markedly more uniform than patterns from prior art vehicle light assemblies, and the undesirable non-uniformities in the prior art light pattern 24 (FIG. 1) are substantially eliminated. The pattern 48 provided by the present invention has substantially continuous within region 48A (FIG. 5), and quickly thins along region 48B to a relatively well defined outer perimeter 48C. Thus, there is relatively little or no stray light or glare produced by lens 42.

An advantageous property of holographic optical element 46 is that the light source 38 (FIG. 7) can be positioned as near as about 0.7 mm from inner surface 44 of lens 42, while the light source 18 (FIG. 3) in the prior art assembly 10 must typically be about 6 mm from the lens 16 including pillow optics in order to be effective. Thus, the map light assembly 30 can be manufactured in a significantly more compact housing. Another advantage is that holographic optical element 46 is more efficient and transmits more light from the source than prior art lenses, as shown in the Table I herebelow. For example, the 20° angle circular device with holographic optical element has a total of about 842 lux, while the prior art device including a pillow optics lens was tested to have a total of only about 679 lux. Still further, the holographic optical element 46 can be constructed to yield a light pattern having a well defined desired shape and size. For example, in the three test devices, a first holographic optical element provided a predetermined circular pattern having a perimeter defined by light reflected at a 20° angle. A second holographic optical element provided a predetermined elliptical pattern having a perimeter defined by light reflected at a 10° angle on one axis and at a 20° angle on a second perpendicular axis. A third holographic optical element provided a predetermined elliptical pattern having a perimeter defined by light reflected at a 5° angle on one axis and at a 20° angle on a second perpendicular axis. It is further noted that the lens 42 can be relatively flat, or can be concave or convex, and can be transparent or reflective, and still have microvariations forming a holographic optical element for controlling light distribution. The points 1–5 in the Table I were taken generally at points P1–P5, respectively, shown on object 40 in FIG. 5 from an identical light source for each of the lenses, although it is noted that the tests were conducted on experimental parts.

TABLE I

|  | Map light with lens (See FIGS. 1 and 5) (Generally circular pattern) | Map light with "holographic optic element" lens (See FIG. 5) (20° angle circular pattern) | Map light with "holographic optic element" lens (See FIG. 5) (10° × 20° angle elliptical pattern) | Map light with "holographic optic element" lens (See FIG. 5) (5° × 20° angle elliptical pattern) |
| --- | --- | --- | --- | --- |
| Point 1* | 62 lux | 58 | 58 | 56 |
| Point 2 | 213 lux | 188 | 125 | 102 |
| (Center) Point 3 | 255 lux | 328 | 418 | 514 |
| Point 4 | 109 lux | 128 | 115 | 92 |
| Point 5 | 140 lux | 140 | 138 | 119 |
| TOTAL | 779 lux | 842 | 854 | 883 |

*Points P1, P2, P4, and P5 are arranged in a generally rectangular pattern about point P3.

The holographic optical element can also be used in other vehicle light assemblies. A door panel 90 (FIG. 9) includes a light source 92 and a lens 94 including a holographic optical element which can direct a desired spot lighting pattern for ingress and egress to and from the vehicle, respectively, in darkness. Another application is shown in FIG. 10 in which an overhead rear seat courtesy light assembly 100 is attached to the headliner 32 including a housing 104, a light source 106, a switch 108 and a lens 110 including a holographic optical element. This assembly provides a well defined pattern of light which can be used by rear seat passengers without distracting the driver.

Thus, in this invention there are provided vehicle lighting accessories including a housing, a light source which may include a reflector, a lens, and/or a reflector for controlling the distribution of light from the light source. The lens and/or reflector includes a surface with microvariations therein forming a holographic optical element that directs light in a predetermined pattern for illuminating an area. Advantageously, the holographic optical element substantially eliminates undesirable uneven light distribution.

In the foregoing description, it will be readily appreciated by those skilled in the art that modifications may be made to the invention without departing from the spirit or scope of the invention as defined by the appended claims.

The embodiments of the invention in which an exclusive property or privilege is claimed are defined as follows:

1. A light assembly for illuminating an interior of a vehicle comprising:

a compact housing configured for attachment to a vehicle in a confined space in a passenger compartment of the vehicle, said housing including a marginal edge configured to matingly engage a relatively flat surface of an interior component of the vehicle, and further including structure forming a light source support;

a light source mounted to said light source support within said housing for supplying light;

a reflector positioned proximate said light source; and a lens mounted to said housing in spaced relationship to said light source for controlling the distribution of light from said light source and said reflector, said lens including a surface with microvariations having a frosted appearance formed therein to define a holographic optical element that directs the light into a predetermined markedly uniform pattern characterized by an absence of substantially any visible undesirable non-uniformities in the predetermined light pattern, said light source being located less than about 0.7 mm from said lens.

2. A light assembly as defined in claim 1 wherein said reflector defines a parabolically-shaped reflective surface about said light source for reflecting light from the light source in a generally parallel direction toward said lens.

3. A light assembly as defined in claim 1 wherein said light source emits light having component light rays with angles of incidence of anywhere between about 10° to about 90° to said surface of said lens.

4. A light assembly as defined in claim 1 wherein said predetermined pattern has a non-circular geometric shape.

5. A light assembly as defined in claim 4 wherein said surface with said microvariations is located on a side of said lens proximate said light source.

6. A light assembly as defined in claim 1 wherein said light source includes at least two lamps.

7. A light assembly as defined in claim 1 wherein said housing includes an exterior surface having a finely textured appearance, said microvariations also having a finely textured appearance that generally matches the appearance of said exterior surface of said housing.

8. A light assembly as defined in claim 1 wherein said housing is concavely shaped for engaging a vehicle headliner with minimal intrusion into a vehicle passenger compartment, and wherein said lens including said microvariations is configured to form the predetermined pattern of light large enough for reading written materials at a distance generally corresponding to the distance from a headliner of the vehicle to a seated passenger's lap.

9. A light assembly as defined in claim 1 and further including a door panel, said housing being attached to said door panel to direct illumination therefrom.

10. A light assembly as defined in claim 1 and further including a headliner, said housing being mounted to said headliner.

11. A map light for a vehicle comprising:

a generally thin housing configured for non-intrusive operative attachment to a vehicle in a passenger compartment thereof, said housing including an opening and an exterior surface, said housing further including a marginal edge configured to matingly engage an interior component of the vehicle with said housing while covering a portion of the component;

a light source mounted to the housing for supplying light, said light source being positioned proximate said opening and positioned to emit light toward said opening; and a lens attached to said housing covering said opening for controlling the distribution of light from said light source, said lens having microvariations having a frosted appearance formed therein to define a holographic optical element configured to direct light into a predetermined pattern for illuminating an object inside the vehicle at a distance equal to or less than the distance from a vehicle headliner to a seated passenger's lap and for eliminating substantially any visible undesirable non-uniform light distribution in and around said pattern, said lens having a textured appearance that generally matches the exterior surface of said housing, said lens defining an inner surface, and said light source being located less than 6 mm from said inner surface of said lens.

12. A map light as defined in claim 11 wherein said light source is located less than about 0.7 mm from said inner surface of said lens, and wherein said housing is concavely shaped but relatively shallow in depth, so that the map light has a compact configuration to prevent unacceptable intrusion into an interior space of the vehicle.

13. In a motor vehicle interior lamp assembly for a vehicle passenger compartment, the lamp assembly comprising a shallow concave housing, a light source supported in the interior of said housing, and a lens having a hidden face disposed toward said light source and an exposed face opposite said hidden face, the improvement comprising:

one of said hidden face and said exposed face having microvariations with a frosted appearance forming a holographic optical element that directs light from the light source to a predetermined area in the vehicle passenger compartment in a particularly uniform and non-glaring manner, the directed light, as a result of passing through the holographic optical element, being characterized by an absence of substantially any visible glare, "spider webbing", light/dark patchiness, and chromatic aberrations.

14. An improvement as defined in claim 13 wherein said hidden face of the lens includes the microvariations.

15. An improvement as defined in claim 13 wherein the light source is positioned within about 6 mm of said hidden face and wherein said lamp assembly has a relatively thin thickness dimension so that the lamp assembly intrudes only minimally into the vehicle passenger compartment when affixed therein.

16. An improvement as defined in claim 15 wherein the light source is positioned within about 0.7 mm of said hidden face.

17. An improvement as defined in claim 13 wherein the lamp assembly includes a housing having an exposed surface which is frosted to have substantially the same visual appearance as said lens so as to limit the visual prominence of said lens with respect to said vehicle interior.

* * * * *